United States Patent [19]
Miyasaka

[11] Patent Number: 6,134,801
[45] Date of Patent: Oct. 24, 2000

[54] BRAKING STRUCTURE OF A MEASURING TAPE

[75] Inventor: Tokuro Miyasaka, Ichikawashi, Japan

[73] Assignee: Index Measuring Tape Co., Ltd., Taipei, Taiwan

[21] Appl. No.: 09/234,747

[22] Filed: Jan. 21, 1999

[51] Int. Cl.[7] ....................................................... G01B 3/10
[52] U.S. Cl. .............................. 33/767; 33/755; 242/381.5
[58] Field of Search ................................ 33/767, 755, 756, 33/761, 769; 242/381.5, 396.8, 396.7, 396.6, 396.5, 385, 385.1

[56] References Cited

U.S. PATENT DOCUMENTS

| | | | |
|---|---|---|---|
| 4,189,107 | 2/1980 | Quenot et al. | 33/761 |
| 4,555,854 | 12/1985 | Kuntze | 33/767 |
| 5,624,085 | 4/1997 | Usami | 33/767 |
| 5,632,453 | 5/1997 | Hioki et al. | 33/767 |

*Primary Examiner*—Christopher W. Fulton
*Attorney, Agent, or Firm*—Pro-Techtor International Services

[57] ABSTRACT

A braking structure of a measuring tape comprises a front wall, a rear wall, a driving means and a braking wheel. Wherein the driving means includes a shaking shaft outside the front wall a rotary disk connected with the shaking rod, a fixing ring fixed on the outer wall of the front wall, a buckling wheel, a measuring tape, and a braking wheel. Characteristic in that a short shaft is projected from the side of the braking wheel, the short shaft and the periphery thereof are inserted into the measuring tape wheel so that the measuring tape wheel is resisted against the braking wheel to rotate. An inclined body inclined gradually is formed on the side of the braking wheel. A convex block is formed on the highest point of the inclined body, while another convex block is formed on the inclined body formed in the rear wall. As the measuring tape wheel is rotated along a pull-out direction, the inclined plane of the braking wheel is rotated on the inclined plane of the rear wall to ascend upwards gradually so to press the measuring tape wheel. Thus the braking wheel will resist against the measuring tape wheel. When the measuring tape wheel is rotated toward the direction of withdrawing the measuring tape, the braking wheel will descend along the rotation of the inclined plane, thus the friction applied on the measuring tape wheel is released. Therefore, whatever the force for pulling the measuring tape is large or small, the desire length of the measuring tape is pulled out steadily and the idle rotation of the measuring tape is prevented.

5 Claims, 6 Drawing Sheets

BRAKING STRUCTURE OF A MEASURING TAPE

BACKGROUND OF THE INVENTION

1. Field of the Invention

The present invention relates to a braking structure of a measuring tape, especially to a braking mechanics by which the measuring tape can be pulled out successfully, and the measuring tape wheel is prevented to rotate idly and the measuring tape is prevented to be wound by error.

2. Description of the Prior Art

The prior art measuring tape is shown in FIG. 1. The measuring tape has a front housing 10, a rear housing 11, a shaking rod 12 and a measuring tape wheel 13. The shaking rod 12 and measuring tape wheel 13 are formed integrally. The measuring tape wheel 13 can be rotated between the front housing 10 and the rear housing 11. A convex shaft 14 is formed on the side thereof and is inserted into the rear housing 11 so to rotate therewithin. A measuring tape 15 is wound around the measuring tape wheel 13. When the measuring tape 15 is pulled, the measuring tape wheel 13 is also rotated.

However, this prior art measuring tape has the following disadvantages:

(1) When the measuring tape 15 is pulled, the measuring tape will drive the measuring tape wheel to freely rotate between the front housing 10 and the rear housing 11. During measurement, the force applies on the measuring tape can not be well controlled by operator. In order to rapidly operate, the measuring tape 15 is often pulled rapidly so that the measuring tape wheel 13 with the housing will idly rotate, therefore, the measuring tape 15 is detached from the measuring tape wheel 13 so that the operator must waste much times for rewinding the measuring tape 15.

(2) If the force applied on the measuring tape 15 is too large, and the idle rotation of the measuring tape wheel is too long so that the released measuring tape is too long and is intricate together. This will affect the work and operator need waste much time to process this condition.

(3) The prior art measuring tape has some inconvenience as it is used in a long measuring tape, since the design of a prior art measuring tape is suitable in short and small diameter measuring tape made by metal. Wherein in the prior art measuring tape, as the measuring tape is pulled out, the spring compresses and a push button is pressed so that a pressing piece will press the surface of a steel rule, thus it is fixed. As the measuring tape is wound, the control button is pushed backwards, the pressing piece will release from the metal measuring tape. By the rewind force of the spring, the measuring tape is rewound. But, this prior art measuring tape can not be used in a long, nonmetal engineering measuring tape.

SUMMARY OF THE INVENTION

Accordingly, the object of the present invention is to provide a braking structure of a measuring tape. According to the braking structure of a measuring tape of the present invention, when the measuring tape wheel is rotated outwards, the inclined plane formed on the lateral surface of the braking wheel will ascend upwards gradually along the inclined plane of the rear wall to press the measuring tape wheel so as to resist against the measuring tape wheel. Thus, the measuring tape can be steadily pulled. Therefore, the idle rotation in the prior art measuring tape wheel is prevented.

According to the braking structure of a measuring tape of the present invention, as using the measuring tape, since the braking wheel will resist against the measuring tape wheel, the user can easily pull out the measuring tape. Thus, the user will not worry that the applied force is too large so that the measuring tape is wound together.

According to the braking structure of a measuring tape of the present invention, as the braking wheel is rewind toward the direction of withdrawing the measuring tape the inclined plane of the belt wheel complies with the inclined plane of the rear wall. Thus, the braking wheel can easily descend to release the friction of the measuring tape wheel.

The present invention will be better understood and its numerous objects and advantages will become apparent to those skilled in the art by referencing to the following drawings in which:

DETAILED DESCRIPTION OF THE PREFERRED EMBODIMENT

Figure 1:
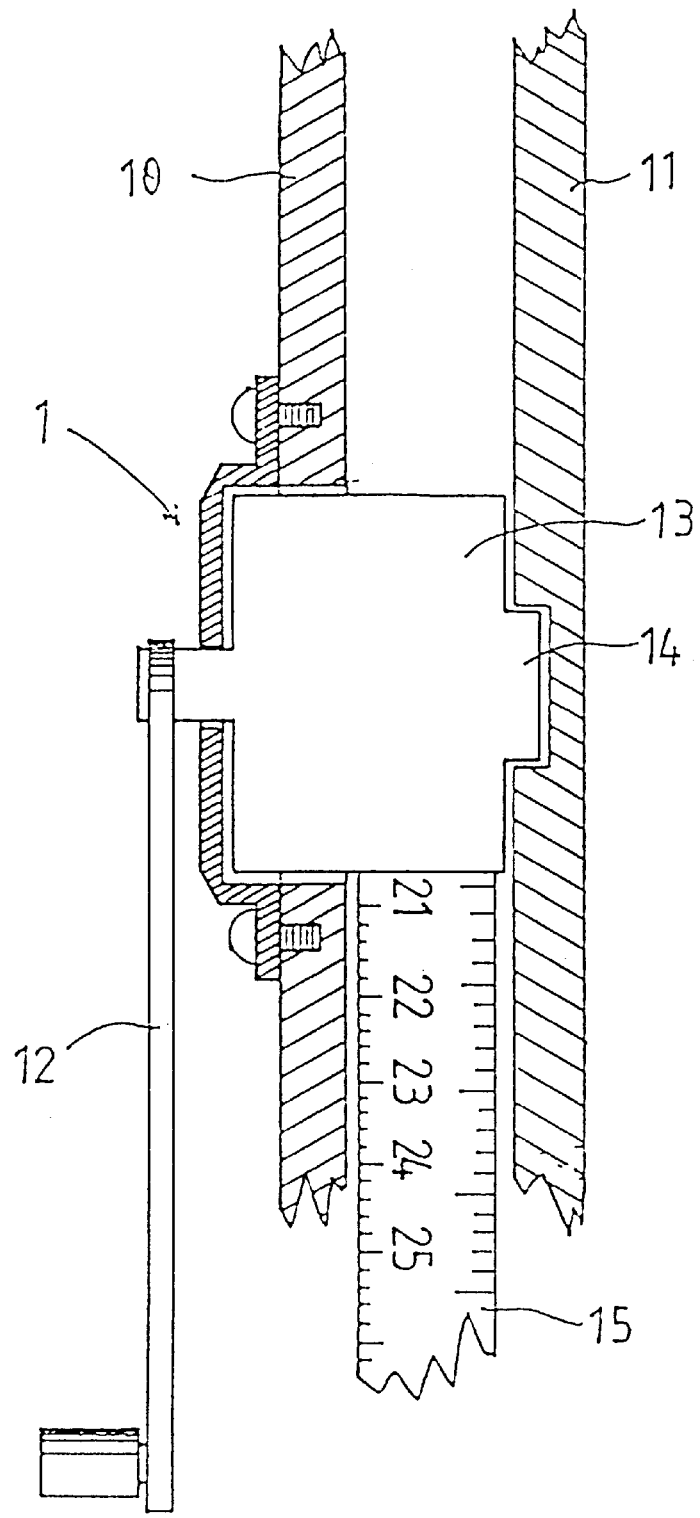
FIG. 1 is a cross sectional view of the driving means of a prior art measuring tape.
Figure 2:
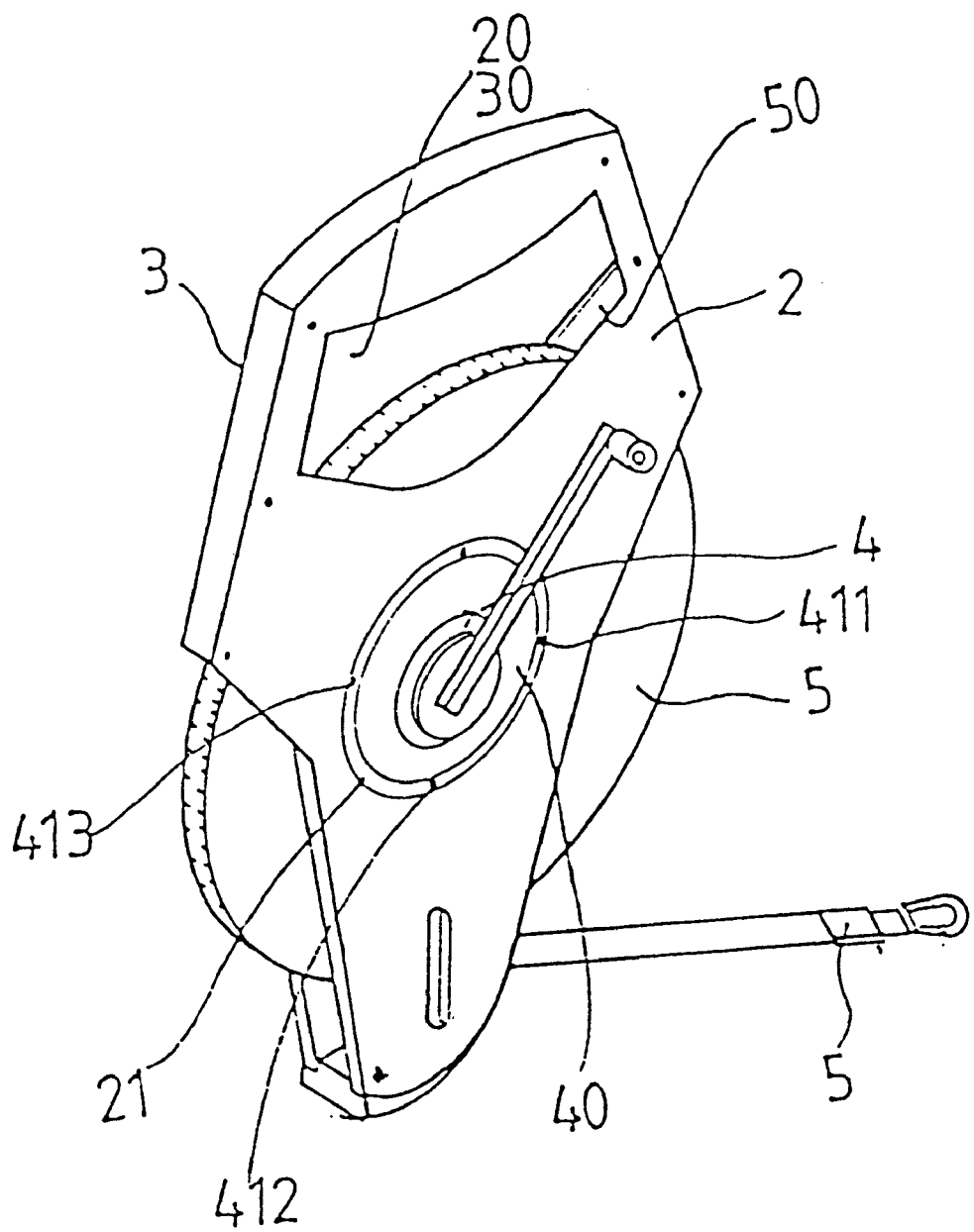
FIG. 2 is a perspective view of the embodiment in the present invention.
Figure 3:
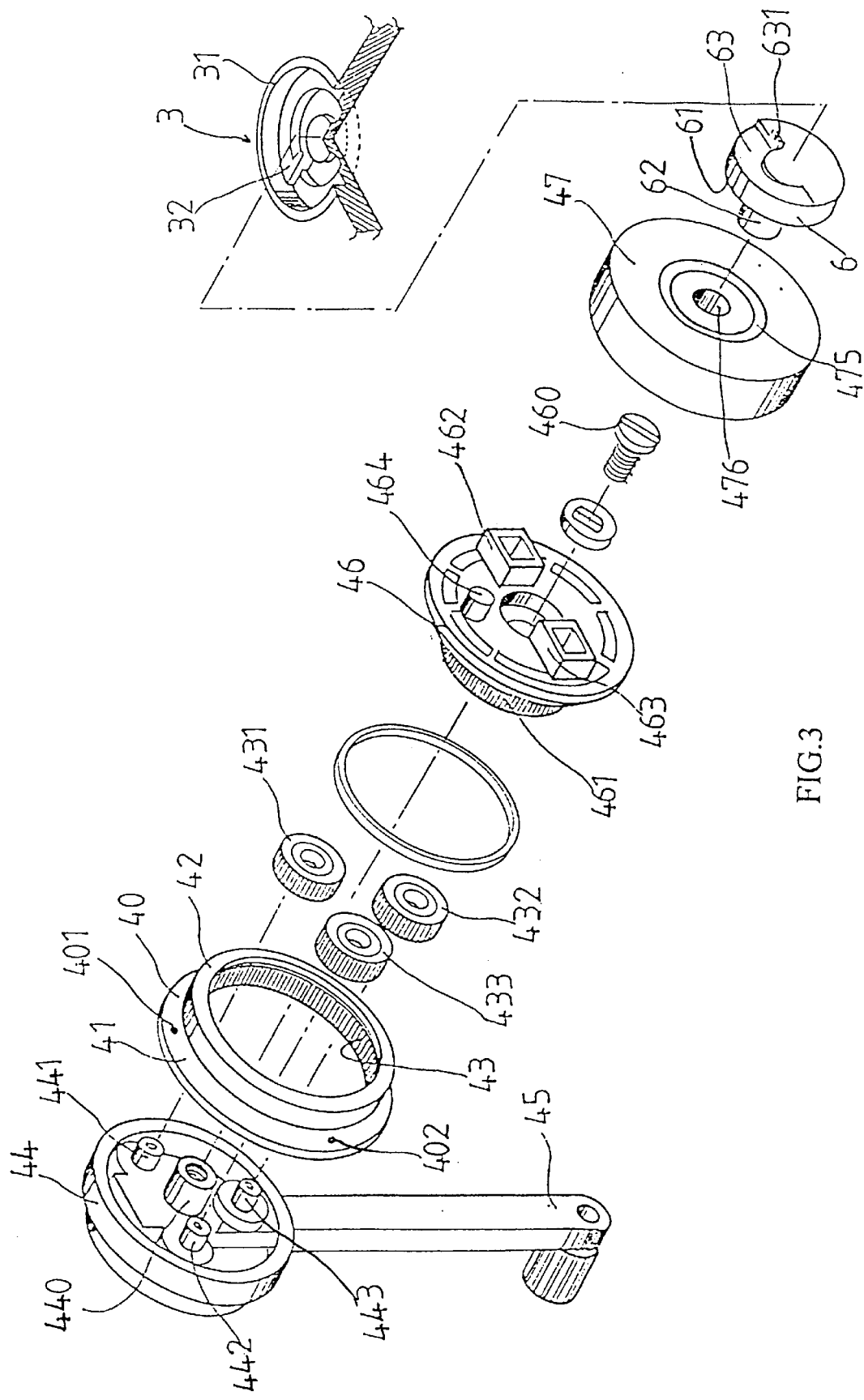
FIG. 3 is an exploded schematic view of the driving means of the present invention.
Figure 4:
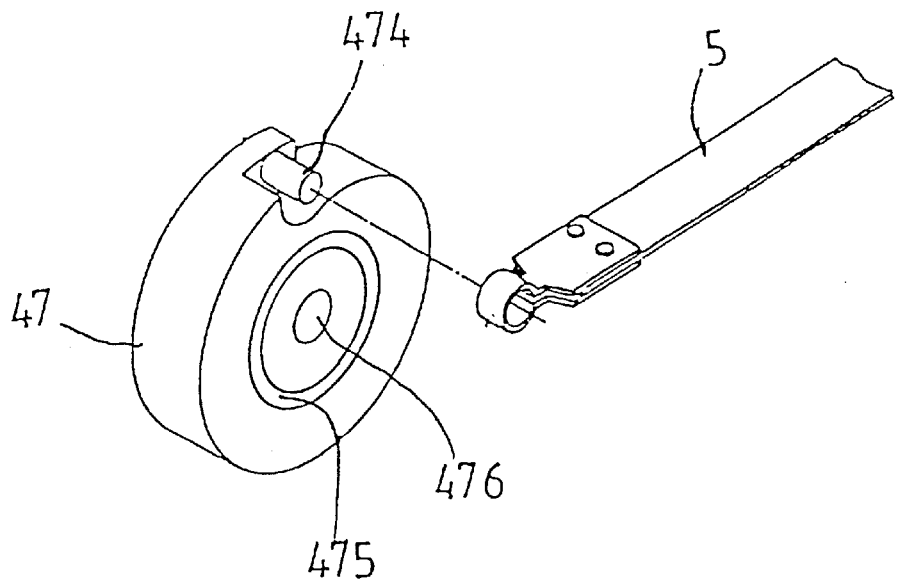
FIG. 4 is a schematic view showing the engagement of the measuring tape wheel and the measuring tape in the present invention.
Figure 5:
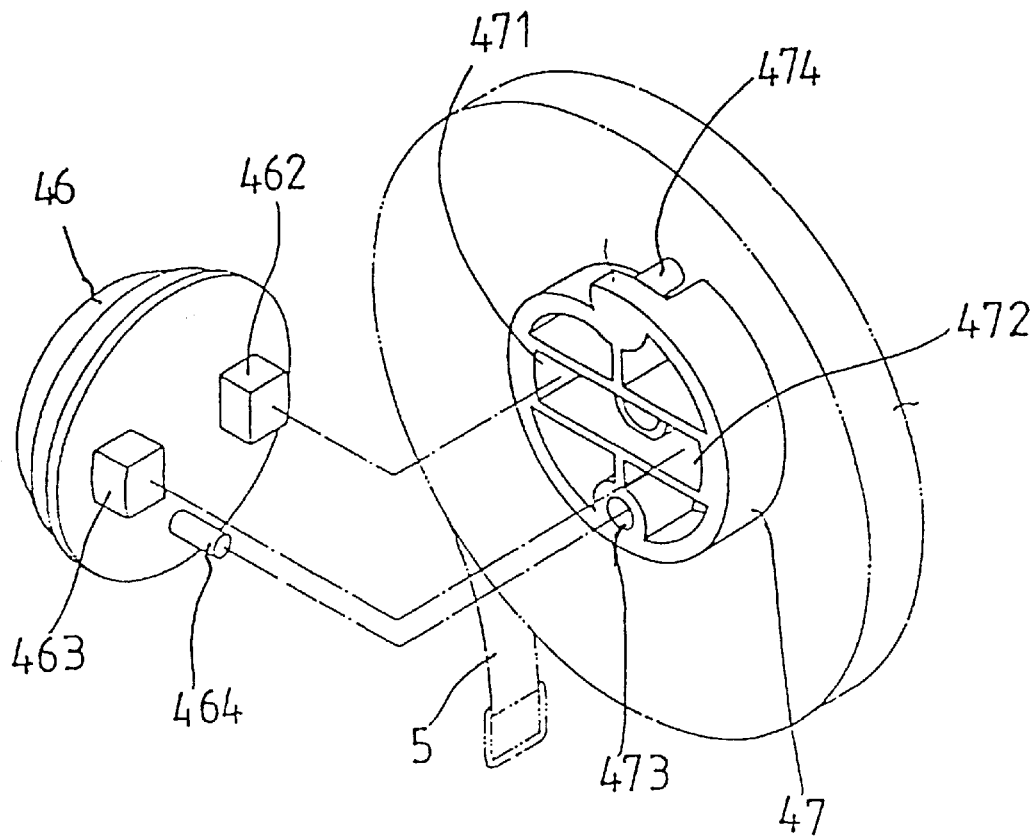
FIG. 5 is a perspective view showing the engagement of the measuring tape wheel and the measuring tape in the present invention.

The embodiment of the present invention is shown in FIG. 2, and the exploded view of the driving means of the present invention is shown in FIG. 3. It is shown that the braking structure of a measuring tape of the present invention comprises a front wall 2, a rear wall 3, driving means 4, a measuring tape 5', a breaking wheel 6 etc. Handles 20 and 30 are formed on the front wall 2 and the rear wall 3. After it is received within the driving means 4, it is fixed by a plurality of screws. After the front wall 2 and the rear wall 3 are fixedly matched. Under the handle 20 and 30 are formed with a receiving space 50 of the measuring tape 5 for receiving the measuring tape 5. A fixing ring hole 21 is formed on the center of the front wall 3. A plurality of fixing holes 211, 212, 213 are formed on the periphery of the fixing ring hole 21 for fixing screws 411, 412, 413 for passing through fixing holes 401, 402, and 403 of the outer ring portion 41 of the fixing ring 40 to fix on the front wall 2.

Referring to FIG. 3, a gear track is formed on the inner rim of the inner ring portion 42 of the fixing ring 40 so to engage with a plurality of planet gears 431, 432 and 433 and can be rotate therewithin. The axial centers of the planet gears 431, 432 and 433 are the respective short shafts 441, 442 and 443 projected from one lateral surface of the rotary wheel 44. The rotary wheel 44 is connected with a shaking rod 45. To rotate the shaking rod 45 will cause the planet gears 431, 432 and 433 are circularly rotated along the gear track 43 formed on the inner rim 42 of the fixing ring 40. A fixing shaft 440 is projected between the rotary wheel 44 and the short shafts 441, 442, and 443. The fixing shaft 440 can be engaged with a buckling wheel 46 and is fixed by the screw 460 and the fixing shaft 440 of the rotary wheel 44. A driving gear 461 is formed on the lateral surface of the buckling wheel 46. The driving gear 461 is received within the plurality of planet gears 431, 432 and 433 to engage with a plurality of planet gears 431, 432 and 433. Convex blocks 462 and 463 and a convex strip 464 are formed on one surface of the buckling wheel 46. Convex blocks 462 and 463 and a convex strip 464 can be buckled into the grooves 471 and 472 and the circular hole 473 within the measuring tape 47. When the buckling wheel 46 is rotated, the measuring tape wheel 47 is driven to rotate. A fixing pillar 474 is formed on the peripheral rim of another lateral surface of the measuring tape wheel 47. The fixing pillar 474 is used to fix one end of the measuring tape. The measuring tape 5 is round around the measuring tape wheel 47 so as to be rotated. A circular groove 475 is formed below the fixing pillar 474 of the measuring tape wheel. An axial hole 476 is formed on the center of the circular groove. The circular groove 475 may cause a convex ring 61 formed on the periphery of the braking wheel 6 to rotate therewithin. A short shaft 62 is projected from the center of the convex ring of the braking wheel 6. The short shaft 62 is inserted into the axial hole 476 of the measuring tape wheel 47.

Figure 6:
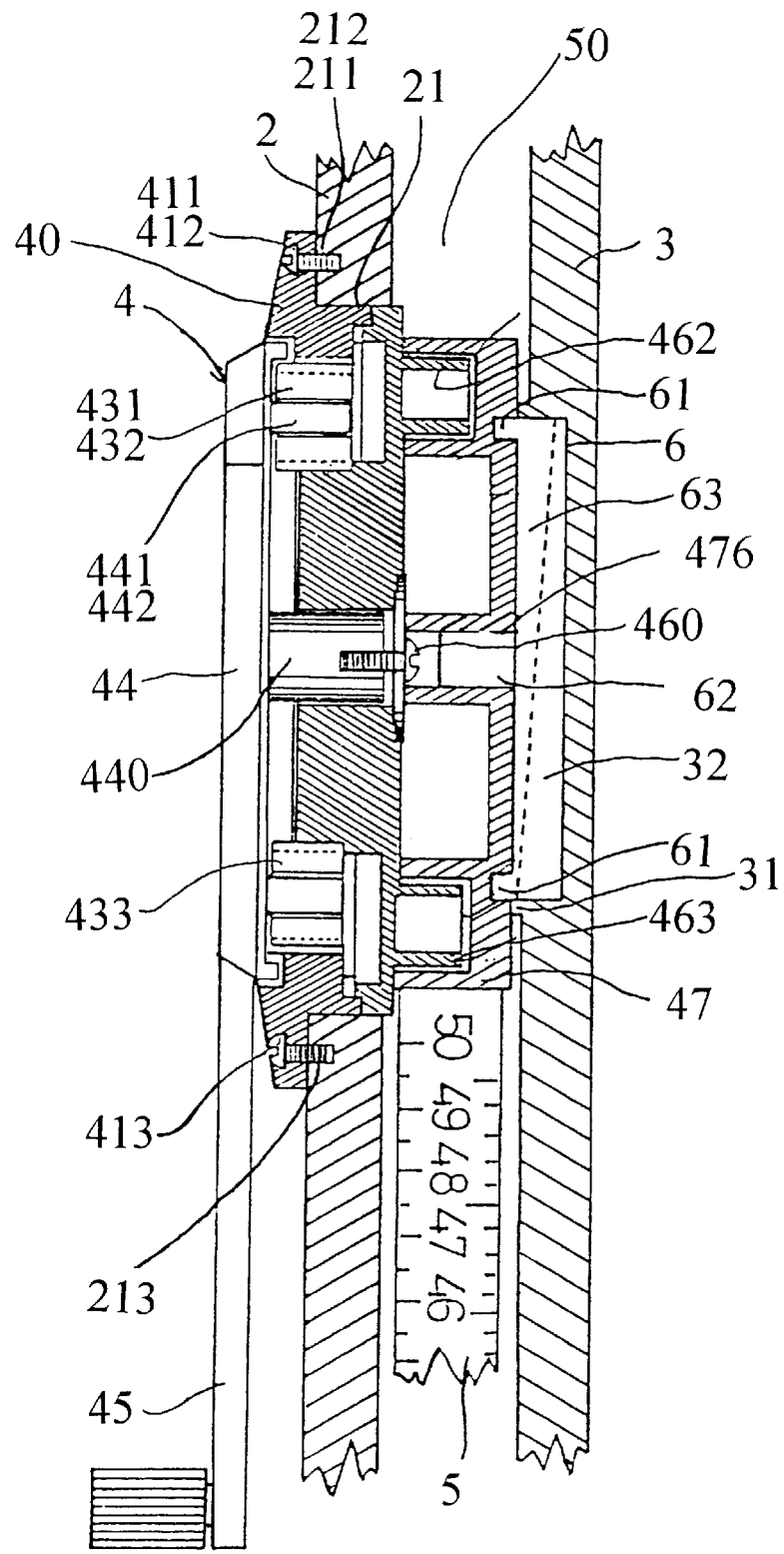
FIG. 6 is a perspective view of the measuring tape, and the inclined plane on the rear wall of the braking wheel.
Figure 7:
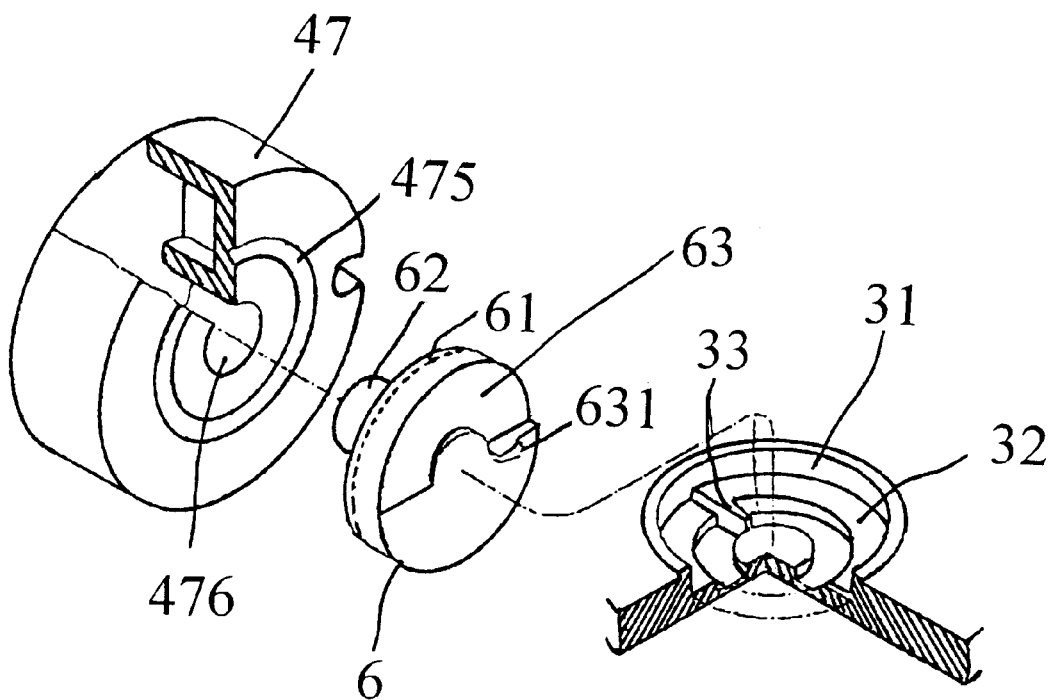
FIG. 7 is an exploded view of the measuring tape wheel, the braking wheel, and the inclined ring portion.

Referring to FIG. 3 and 6, an inclined plane 63 is formed on the lateral surface of the braking wheel 6. A convex block 631 is projected from the highest point of the inclined plane 63. The inclined plane 63 of the braking wheel 6 is inclined smoothly and gradually from one side of the convex block 631 to another side of the high point. The inclined plane 63 can rotate within the ring portion 31 formed on the inner wall of the rear wall 3. A projected inclined ring portion 32 is formed on the bottom of the ring portion 31 of the rear wall 3. A convex strip 33 is extended from the highest point of the inclined ring portion 32. When the braking wheel 6 is located within the ring portion 31, the lower point of the inclined plane 63 is located on the highest point of the ring portion 31, and the convex block 631 of the inclined plane 63 is resisted against the convex strip 33 of the inclined ring portion 32.

When the measuring tape 5 is pulled, the inclined plane 62 of the braking wheel 6 will rotate along the convex strip 33 and then gradually ascend upwards. Now the highest point of the braking wheel 6 is located on the highest point of the inclined ring portion 32 so that the braking wheel 6 will resist against the measuring tape wheel 47 by friction force, while the convex block 631 of the inclined plane 63 is located on another side of the convex strip 32 so to be blocked by the convex strip 33. Thus, the braking wheel 6 will project to resist against thereto and the rotation is stopped. Therefore, if the measuring tape 5 is pulled again, the measuring tape wheel 47 will press by the braking wheel 6 so only to rotate along the short shaft 62 of the braking wheel 6.

When rotating the shaking rod 45 for receiving the measuring tape 5, the measuring tape wheel 47 will drive the braking wheel 6 to rotate backwards. Thereby, the inclined plane 63 of the braking wheel 6 also rotates along the inclined ring 32 and descends gradually to restore to the lowest point of the inclined plane 63 so to resist against the highest point of the inclined ring portion 32 and the friction to the measuring tape wheel 47 is released. While the convex block 631 of the braking wheel 6 is blocked by the convex strip 33 of the inclined ring 32 so that the braking wheel 6 will not rotate again. Then the measuring tape 47 is rotated on the short shaft 62 of the braking wheel 6, thus the measuring tape is restored easily.

Therefore, it is appreciated from the above description that in braking structure of a measuring tape of the present invention, the inclined plane 63 generated by the braking wheel 6 can be rotated on the inclined ring portion 32 of the rear wall 3 to project and ascend so to press against the measuring tape wheel 47. Thus, the measuring tape is prevented to rotate idly and the measuring tape can wind effectively.

Although the present invention has been described using specified embodiment, the examples are meant to be illustrative and not restrictive. It is clear that many other variations would be possible without departing from the basic approach, demonstrated in the present invention.

What is claimed is:

1. A braking structure of a measuring tape comprising a front wall, a rear wall, a driving means and a braking wheel; wherein the driving means includes a shaking shaft outside the front wall, a rotary disk connected with the shaking rod, a fixing ring fixed on the outer wall of the front wall, a buckling wheel, a measuring tape, and a braking wheel, characteristic in that a short shaft is projected from the side of the braking wheel, the short shaft and the periphery thereof are inserted into the measuring tape wheel so that the measuring tape wheel is resisted against the braking wheel to rotate, an inclined body inclined gradually is formed on the side of the braking wheel, a convex block is formed on the highest point of the inclined body, while another convex block is formed on the inclined body formed in the rear wall, as the measuring tape wheel is rotated along a pull-out direction, the inclined plane of the braking wheel is rotated on the inclined plane of the rear wall to ascend upwards gradually so to press the measuring tape wheel, thus the braking wheel will resist against the measuring tape wheel, when the measuring tape wheel is rotated toward the direction of withdrawing the measuring tape, the braking wheel will descend along the rotation of the inclined plane, thus the friction applied on the measuring tape wheel is released, therefore, no matter the force for pulling the measuring tape is large or small, the desire length of the measuring tape is pulled out steadily and the idle rotation of the measuring tape is prevented.

2. The braking structure of a measuring tape as claimed in claim 1, wherein one side of the braking wheel is formed as an inclined plane, a convex block is projected from the highest point of the inclined plane, the inclined plane of the braking wheel descends steadily from one side of the convex block on the highest point to another side of the highest point, the inclined plane is rotated within the ring portion formed on the inner wall of the rear wall so that the braking wheel ascends and projects to press the measuring tape wheel.

3. The braking structure of a measuring tape as claimed in claim 1, wherein a circular ring is formed on the inner wall of the rear wall, a convex inclined ring portion is formed on the bottom thereof, a strip is extended inwards from the highest point of the inclined ring so that the braking wheel is received within the circular ring portion and rotated therewithin.

4. The braking structure of a measuring tape as claimed in claim 3, wherein in the rear wall, the inclined ring portion thereof is located on one side of the convex strip in the highest point and then it descends gradually to another side of the highest point, by the inclined ring portion, the inclined plane of the braking wheel is rotated thereon so that the braking wheel ascended.

5. The braking structure of a measuring tape as claimed in claim 3, wherein a convex strip is extended inwards from the highest point of the inclined ring portion of the rear wall, thereby, as the braking wheel ascends to the highest point, it will resist against the convex block of the braking wheel so that as the braking wheel is pulled out from the measuring tape, the braking wheel is retained in a state of resisting the measuring tape wheel.

* * * * *